United States Patent [19]

Eberlin

[11] Patent Number: 5,143,338
[45] Date of Patent: Sep. 1, 1992

[54] HOLDING DEVICE

[75] Inventor: Philip C. Eberlin, Chicago Heights, Ill.

[73] Assignee: Woodwork Restoration, Inc., Chicago Heights, Ill.

[21] Appl. No.: 737,674

[22] Filed: Jul. 30, 1991

[51] Int. Cl.⁵ ............................................. A47K 1/08
[52] U.S. Cl. ................................. 248/313; 248/154; 248/315; 248/316.2
[58] Field of Search ............... 248/154, 314, 315, 313, 248/309.1, 316.2

[56] References Cited

U.S. PATENT DOCUMENTS

| | | | |
|---|---|---|---|
| 4,046,345 | 9/1977 | Boyd, Sr. | 248/154 |
| 4,561,200 | 12/1985 | Hehn | 248/316.2 X |
| 4,919,381 | 4/1990 | Buist | 248/314 X |
| 5,054,733 | 10/1991 | Shields | 248/313 |

*Primary Examiner*—Ramon O. Ramirez
*Attorney, Agent, or Firm*—Trexler, Bushnell, Giangiorgi & Blackstone, Ltd.

[57] ABSTRACT

A holding device comprises a top, an actuable body, and a base. The top has a depending portion which defines a holding aperture. The top is connected to the base at the depending portion, and the actuable body is disposed about the depending portion. Adjustable holding elements are disposed within the holding aperture. The adjustable holding elements are shiftable between an extended and a retracted position in response to actuation of the actuable body.

11 Claims, 1 Drawing Sheet

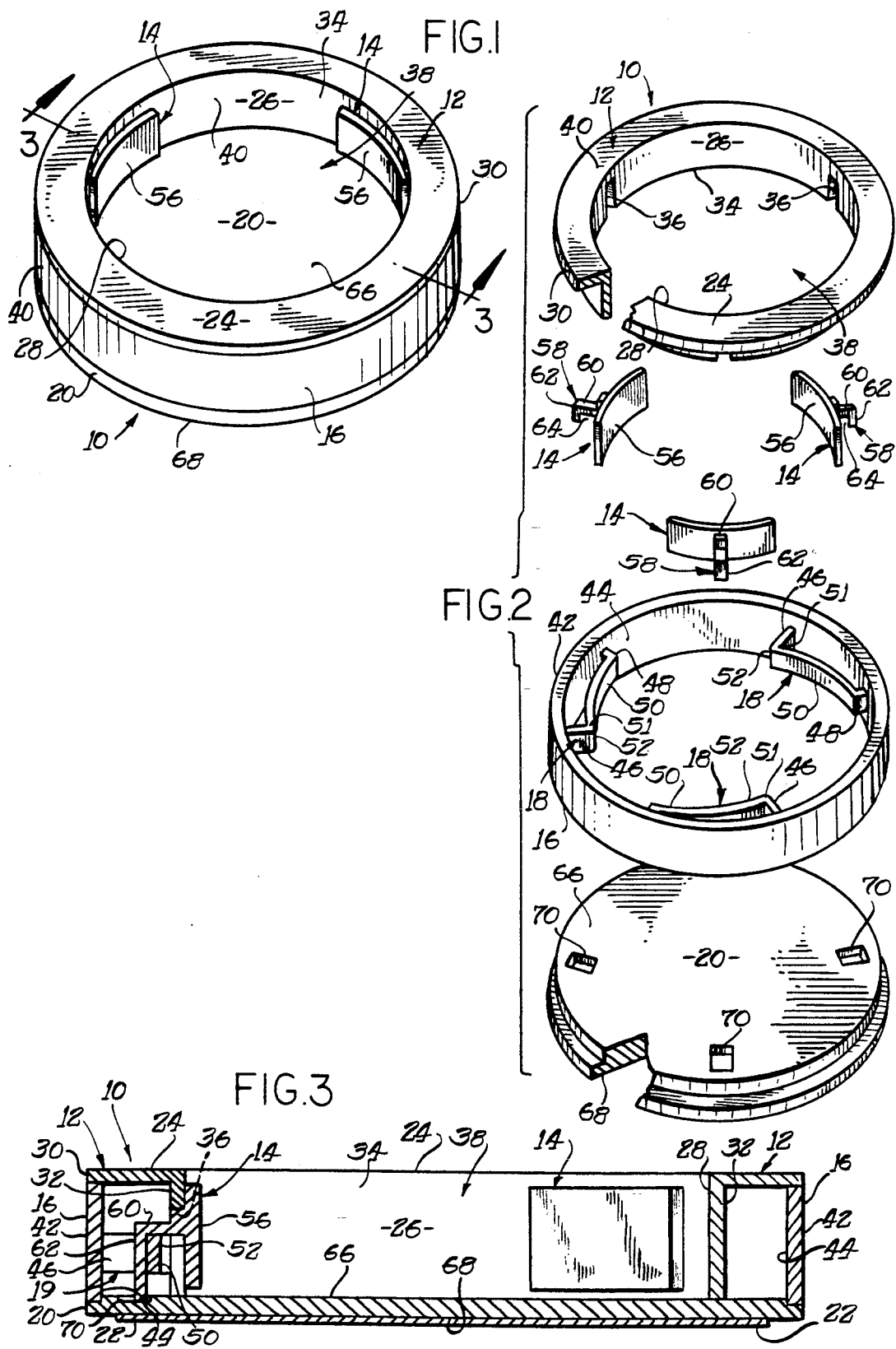

5,143,338

HOLDING DEVICE

BACKGROUND AND SUMMARY OF THE INVENTION

The present invention relates generally to a new and unique device for releasably holding an object in a plurality of positions. More specifically, the invention relates to a device, which can be mounted in a plurality of positions in a plurality of ways, for releasably holding objects of variable sizes in a plurality of positions.

Given the demands of today's modern society, there is a constant demand for new methods and apparatuses for holding or retaining certain objects. This demand is fueled by, to mention only a few, the fast-paced lifestyle many people face, and the somewhat cramped conditions in which people work and live.

For instance, many people currently live a long distance from their place of employment. Accordingly, those people must commute substantial distances to and from work each day, taking up valuable time. Before some people feel up to the tasks of the day, they need to have their morning coffee, or other suitable breakfast drink, in order to "get the day going." However, because some of these people live such a far distance away from their places of employment, they often must forego their morning beverage in order to save time. This often results in reduced effectiveness in the workplace.

In an effort to avoid this reduced effectiveness and to still save time, some people take their morning beverages with them, and consume them as they drive to work. This, however, can be dangerous because the driver must keep one hand on his beverage container in order to prevent the beverage contained therein from spilling. This prevents the driver from keeping both hands on the steering wheel, thereby compromising his own safety as well as the safety of the other drivers and pedestrians in his vicinity. In order to solve this safety problem, a beverage container holder is often used. However, these beverage container holders are often useful with only one particular construction of a beverage container. Thus, when a person uses a differently constructed beverage container, the holder is useless, thereby causing the original, unsafe highway condition to return.

Other problems are caused by the restricted utility of other holding apparatuses. For example, many people experience shortages of closet space. In order to be able to place more and more material into a closet, many people place a horizontal dowel rod therein and hang objects from the dowel rod. The dowel rod is usually mounted on the walls of the closet by a holding apparatus designed specifically to hold a certain dowel rod configuration.

As a person suspends more and more articles from the dowel rod, the rod begins to bend under the increased weight. To solve this problem before the rod breaks under the combined weight of the articles, the rod is often replaced by a thicker, stronger rod. However, the replacement process is not that easy. Because the holding apparatus was constructed to work with a particularly configured dowel rod, the holding apparatus is not suitable for employment with a thicker, differently configured rod. Accordingly, not only must the dowel rod be replaced, but also the holding apparatus must be replaced.

The holding device, constructed according to the teachings of the present invention, provides solutions to the above-stated problems and others. The present invention is capable of releasably holding objects of various sizes. Thus, the holding device of the present invention can be effectively employed with beverage containers and dowel rods, for example, having different constructions and external configurations. Because the holding device can hold different configurations and constructions, it is capable of holding an object in a plurality of positions. Also, the holding device itself can be mounted in a plurality of positions, so that the holding device can, in turn, releasably hold objects in a further plurality of positions.

OBJECTS AND SUMMARY OF THE INVENTION

A general object of the present invention is to provide a holding device having adjustable means for releasably holding objects of different configurations in a plurality of positions.

A more specific object of the invention is to provide a holding device having adjustable jaws shiftable between an extended position and a retracted position capable of releasably engaging and holding an object.

Another object of the present invention is to provide a holding device having means for shifting the jaws between an extended and a retracted position.

An additional object of the invention is to provide a holding device having a rotatable ring capable of shifting the jaws between an extended position and a retracted position corresponding to the ring rotation.

A further object of the present invention is to provide a holding device having a base plate having mounting means capable of attaching the device to another object in a plurality of positions.

Another object of the invention is to provide a holding device having an aperture therein of sufficient size to accept a portion of the object to be held thereby.

An additional object of the present invention is to provide a holding device having mounting means in the form of double-sided tape, hook and loop fabric, a bracket, or a suction cup.

A further object of the invention is to provide a holding device having jaws which define a periphery releasably engagable with an object to be held for releasably holding the object.

Another object of the invention is to provide a holding device having jaws disposed symmetrically about the holding device.

Another object of the present invention is to provide a holding device having a base of a configuration sloping at an angle complementary to a angle through which a sloped pad, to which the holding device is desired to be mounted, slopes.

A holding device capable of releasably holding objects of various constructions and configurations in a plurality of positions, constructed according to the teachings of the present invention, comprises a top, an actuable body, and a base. The top has a depending portion which defines a holding aperture. The top is connected to the base at the depending portion, and the actuable body is disposed about the depending portion. Adjustable holding elements are disposed within the holding aperture. The adjustable holding elements are shiftable between an extended and a retracted position in response to actuation of the actuable body.

BRIEF DESCRIPTION OF THE DRAWINGS

The organization and manner of the structure and operation of the invention, together with further objects and advantages thereof, may best be understood by reference to the following description taken in connection with the accompanying drawings, wherein numerals identify like elements in which:

FIG. 1 is a perspective view of a holding device, constructed according to the teachings of the present invention, showing the unique construction thereof;

FIG. 2 is an exploded view of the holding device illustrated in FIG. 1 showing the constructions and structural relationships of the elements thereof; and FIG. 3 is a sectional view, taken along line 3—3 of FIG. 1, of the holding device.

DETAILED DESCRIPTION OF A PREFERRED EMBODIMENT

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Referring initially to FIG. 1, a holding device 10, constructed according to the teachings of the present invention, is shown. While the holding device 10 is illustrated, and will be described herein, having a substantially circular configuration and construction, it is to be understood that the invention is not limited to that type of construction or configuration. The configuration of the holding device 10 can take on a number of forms depending on the general external configuration of the object to be held thereby.

The individual elements comprising the holding device 10 are shown clearly in FIG. 2. Generally, the holding device 10 comprises a top 12, a plurality of adjustable holding elements in the form of jaws 14, an actuable body in the form of a ring 16 having a plurality of jaw support members 18, and a base 20. Suitable mounting means 22 is preferably attached to the base 20 so that the holding device 10 can be mounted in a plurality of positions. The mounting means 22 is shown in FIG. 3 in the form of double-sided adhesive tape, although it is to be understood that other forms of mounting means 22 can be used, depending upon the particular task to be undertaken, such as a bracket, a piece of hook and loop fabric, a specially designed base construction, a suction cup, or other suitable mounting device.

The top 12 comprises a flange 24 and a depending portion 26. The flange 24 is substantially washer-shaped, having an inner diameter 28 and an outer diameter 30. The outer diameter 30 defines a portion of the external configuration of the holding device 10. The inner diameter 28 defines the demarcation and juncture between the flange 24 and the depending portion 26. The size of the inner diameter 28 is pre-determined by the external dimensions of the objects to be held by the holding device 10.

The depending portion 26 projects downwardly away from the flange 24. The depending portion 26 is substantially perpendicular to the flange 24. The depending portion 26 has a width somewhat larger than a corresponding width of the ring 16. In this fashion, as will be discussed more fully herein, the depending portion 26 connects the top 12 to the base 20.

The depending portion 26 has a first diameter 32 and a second diameter 34 somewhat smaller than the first diameter 32. The first diameter 32 is larger than the inner diameter 28 of the flange, while the second diameter 34 is substantially equal to the inner diameter 28. The depending portion 26 has a plurality of notches 36 therein which allow for the variable passage of portions of the jaws 14, as discussed below.

The depending portion 26 defines a holding aperture 38 having a perimeter and dimensions of appropriate size to accept a portion of the object, not shown for clarity, to be held. As will be discussed herein, the effective diameter of the holding aperture 38 is dependent upon the shifting of the jaws 14. Both the flange 24 and the depending portion 26 bear gripping means in the form of scores 40, knurls, or other suitable surface texturing in order to facilitate gripping of the holding device 10 and the gripping of an object by the holding aperture 38.

The ring 16 is substantially ring-shaped and also has a first diameter 42 and a second diameter 44. Both the first and second diameters 42 and 44 of the ring 16 are substantially larger than the first and second diameters 32 and 34 of the depending portion 26. This particular construction is desirable so that the ring 16 can rotatably surround the depending portion 26. The ring 16 also has gripping means in the form of scores 40. The scores 40 disposed on the first diameter 42 are useful for rotating the ring 16, as will be discussed herein.

The jaw support members 18 are disposed on the second diameter 44 of the ring 16 so that the jaw support members 18 project into the interior of the ring 16. The jaw support members 18 are located on the second diameter 44 at positions corresponding to the positioning of the notches 36 on the depending portion 26 of the top 12. In this manner, portions of the jaws 14 can extend from through the notches 36 in the depending portion 26 and into the jaw support members 18 Preferably, there are three jaw support members 18 disposed equidistantly along the second diameter 44 of the ring 16 corresponding to the number and disposition of the notches 36.

Referring to FIG. 2 and FIG. 3, the structure of the jaw support members 18 is disclosed. Each jaw support member 18 comprises a first portion 46, a second portion 48, and a third portion 50 connecting the first portion 46 to the second portion 48. The first and second portions 46 and 48 both extend substantially perpendicularly away from the second diameter 44 of the ring 16 into the interior thereof. The first portion 46 extends away from the second diameter 44 a distance substantially greater than a corresponding distance extended by the second portion 48. Thus, the first portion 46 has an end opposite to the second diameter 44 which is further away from the second diameter 44 than a corresponding end of the second portion 48.

The first and second portions 46 and 48 are disposed on the second diameter 44 a certain distance apart along the second diameter 44. The third portion 50 extends from the first portion 46 to the second portion 48, and connects the first and second portions 46 and 48 at their respective ends opposite to the second diameter 44. Because of the relative lengths of the first and second portions 46 and 48, the third portion 50 slopes downwardly towards the second diameter 44 of the ring 16 from the first end 46 to the second end 48.

However, the third portion 50 does not extend from the first portion 46 to the second portion 48 linearly, but it extends in a substantially convexly arcuate fashion. In this way, the third portion 50 defines a curved surface which complements the curved surface of the depending portion 26 defined by the first diameter 32. This is desirable because the ring 16 is disposed concentrically about the depending portion 26. At a point 51 defined by the juncture between the first portion 46 and the third portion 50, the third portion 50 defines a projecting diameter 52 which is substantially equal to the first diameter 32 on the depending portion 26. Thus, the jaw support members 18 contact and slidably engage the first diameter 32 of the depending portion 26.

The construction of the jaws 14 is illustrated clearly in FIG. 2 and FIG. 3. Essentially, the jaws 14 comprise a holding element or pad 54 bearing a face 56 and a handle 58 comprising a base 60 and a leg 62. The pad 54 is substantially arcuate in shape, although other shapes may be used depending upon the external configuration of the object to be held by the holding device 10. The face 56 is mounted on one side of the pad 54, conforms substantially the shape of the pad 54, and is preferably composed of a material which can provide sufficient friction upon engagement with an object so that the object will be releasably held by the jaws 14 firmly within the holding aperture 38. The face 56 may be inclined with respect to the pad 54 to further assist in providing the necessary friction.

The base 60 of the handle 58 is connected to the pad 54 on a side thereof opposite to the side thereof on which the face 56 is mounted. The base 60 extends substantially perpendicularly away from the pad 54 a certain, pre-determined distance. An end of the base 60 opposite to the end thereof connected to the pad 54 is connected to the leg 62. The leg 62 depends substantially perpendicularly downward from the base 60 substantially parallel to the pad 54. The base 60 and the leg 62 thereby define a space 64 of sufficient size to accept the thickness of the third portion 50 of the jaw support members 18, as shown in FIG. 3. The space 64 allows the jaws 14 to move slidably or otherwise to be shifted along the length of the third portion 50 of the jaw support members 18 between an extended position and a retracted position. The extended position is defined by the base 60 and leg 62 being proximate to the juncture between the first portion 46 and the third portion 50, and the retracted portion is defined by the base 60 and the leg 62 being proximate to the juncture between the second portion 48 and the third portion 50.

The base 20 of the holding device 10 is substantially planar and circular in shape, however, other shapes can be used depending upon the particular employment to be fulfilled by the holding device 10. For instance, the base 20 may be provided with a configuration sloped at an angle complementary to an angle defined by a sloping pad, such as a dashboard, to which the holding device 10 is to be mounted.

The base 20 has a first side 66 and a second side 68. The first side 66 has means, shown in FIG. 2 in the form of slots 70, for slidably mounting the legs 62 of the jaws 14 to the base 20 in order to firmly support the jaws 14 in engagement with the periphery of a container. The first side 66 also has means for fixedly attaching the base 20 to the depending portion 26 of the top 12. This means can take on a number of forms, such as heat welding, glue, and other suitable fastening devices. The second side 68 is opposite to the first side 66, and the mounting means 22 discussed above is disposed on the second side 68.

In the following paragraphs, the operation of the holding device 10 will be discussed. Beginning with the individual elements of the holding device 10 as detailed above, the appropriate mounting means 22 is attached to the second side 68 of the base 20. The base 20 is placed flat on its second side 68 with the first side 66 facing upwards. The ring 16 is placed on top of the first side 66 concentrically with the base 20.

The jaws 14 are placed on the jaw support members 18. Specifically, the jaws 14 are positioned so that the width of the third portion 50 of the jaw support members 18 is within the space 64 defined by the base 60 and the leg 62, as shown in FIG. 3. The top 12 is now placed over the ring 16. The top 12 is positioned so that the notches 36 are aligned with the bases 60 of the handles 58 of the jaws 14. This is necessary because if this alignment is not achieved, the top 12 cannot be positioned against the base 20. The depending portion 26 is within the interior of the ring 16.

The top 12 is pushed downwardly until it engages the first side 66 of the base 20. The handles 58 of the jaws 14 are disposed within the notches 36. The means for mounting the top to the base is employed to secure the top 12 to the base 20. Structurally, the top 12 and the base 20 are one unit. However, the ring 16 is capable of rotational movement about the depending portion 26. The holding device 10 is ready for use.

To use the holding device 10, it is often first mounted onto another object by use of the mounting means 22. The jaws 14 are shifted into the retracted position, and a desired portion of the object to be held is inserted into the holding aperture 38. If the portion of the object is of proper size, it will engage the face 56 of the jaws 14, and will be held firmly within the holding aperture 38 due to friction with the face 56. However, if the portion of the object is smaller than the size defined by the jaws 14 in the retracted position, then the ring 16 is rotated.

As the ring 16 is rotated, the jaws 14 do not rotate with it due to the interference with the notches 36. However, the handle 58 slides along the third portion 50 from a position proximate to the second portion 48 to a position proximate to the first portion 46. By so shifting or sliding, the pad 54 and the face 56 move inwardly towards the center of the holding aperture 38. This shifting brings the jaws 14 into firm engagement with the portion of the object to be held.

To release the object from the holding device 10, the ring 16 is rotated in a direction opposite to the one described above. By so rotating the ring 16, the handles 58 of the jaws 14 are moved from the extended position towards the retracted position. As the jaws 14 retract, the object has sufficient clearance to avoid frictioned engagement with the face 56. The object can now be freely removed from the holding aperture 38.

The holding device 10, constructed according to the teachings of the present invention, presents numerous advantages to users thereof. Because the holding elements 14 are adjustable, a single holding device 10 can be used with different objects having different external configurations. The shifting of the jaws 14 increases the ease of changing the objects held within the device 10, or the positions thereof. Given the fast-paced, space-limited lifestyles led by many people today, the holding device 10 is a highly desirable apparatus.

While a preferred embodiment of the present invention is shown and described, it is envisioned that those skilled in the art may devise various modifications of the present invention without departing from the spirit and scope of the appended claims. The invention is not intended to be limited by the foregoing disclosure, but only by the following appended claims.

The invention claimed is:

1. A holding device useful for holding a plurality of objects in a plurality of positions comprising: a top, an actuable body, and a base; the top having a depending portion defining a holding aperture; the top being connected to the base at the depending portion; the actuable body being disposed about the depending portion; adjustable holding elements disposed within the holding aperture; and means for shifting the adjustable holding elements between an extended and a retracted position upon actuation of the actuable body.

2. A holding device as described in claim 1 wherein the adjustable holding elements comprise jaws.

3. A holding device as described in claim 2 further comprising jaw support members disposed on the actuable body.

4. A holding device as described in claim 3 wherein the jaw support members comprise a first portion, a second portion, and a third portion; the first portion extending away from the actuable body a certain distance greater than a distance by which the second portion extends away from the actuable body; and the third portion connecting the first portion to the third portion.

5. A holding device as described in claim 4 wherein the jaws comprise a pad and a handle, and the third portion being insertable between the handle and the pad so that the jaws are shiftable between an extended position and a retracted position along the third portion.

6. A holding device as described in claim 1 wherein the adjustable holding elements are disposed equidistantly along the actuable body.

7. A holding device as described in claim 1 further comprising mounting means disposed on the base.

8. A holding device as described in claim 7 wherein the mounting means consists one of double-sided tape, a piece of hook and loop fabric, a bracket, and a suction cup.

9. A holding device as described in claim 5 wherein the handles of the jaws are slidably mounted in slots disposed on the base.

10. A holding device as described in claim 1 further comprising gripping means disposed on the device which facilitates gripping thereof.

11. A holding device as described in claim 1 wherein the base has a configuration sloping at an angle complementary to a angle defined by a sloping pad to which the base is to be mounted.

* * * * *

UNITED STATES PATENT AND TRADEMARK OFFICE
CERTIFICATE OF CORRECTION

PATENT NO. : 5,143,338

DATED : September 1, 1992

INVENTOR(S) : Philip C. Eberlin

It is certified that error appears in the above-identified patent and that said Letters Patent is hereby corrected as shown below:

Column 3, Line 7 "wherein numerals" should read -- wherein like reference numerals --

Column 8 Line 14 "the mounting means consists one of double" should read -- the mounting means consists of one of double --

Signed and Sealed this

Fifth Day of October, 1993

Attest:

BRUCE LEHMAN

Attesting Officer

Commissioner of Patents and Trademarks